(12) United States Patent
Franceschini et al.

(10) Patent No.: US 8,428,100 B2
(45) Date of Patent: Apr. 23, 2013

(54) SYSTEM AND METHODS FOR SECURING DATA TRANSMISSIONS OVER WIRELESS NETWORKS

(75) Inventors: Michael R. Franceschini, Centerport, NY (US); Yunjung Yi, St. Louise, MO (US); Kelly P. Muldoon, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1234 days.

(21) Appl. No.: 12/246,365

(22) Filed: Oct. 6, 2008

(65) Prior Publication Data

US 2009/0097531 A1    Apr. 16, 2009

Related U.S. Application Data

(60) Provisional application No. 60/978,365, filed on Oct. 8, 2007.

(51) Int. Cl.
*H04B 1/00* (2006.01)

(52) U.S. Cl.
USPC .......................................... 375/133; 375/132

(58) Field of Classification Search .................. 375/133, 375/132, 130
See application file for complete search history.

(56) References Cited

U.S. PATENT DOCUMENTS

| | | | |
|---|---|---|---|
| 5,166,953 A | 11/1992 | Hershey et al. | |
| 5,311,541 A | 5/1994 | Sanderford, Jr. | |
| 5,751,730 A * | 5/1998 | Mourot | 714/755 |
| 5,828,693 A * | 10/1998 | Mays et al. | 375/136 |
| 5,970,055 A | 10/1999 | Park et al. | |
| 6,169,761 B1 | 1/2001 | Marcoccia et al. | |
| 6,697,415 B1 | 2/2004 | Mahany | |
| 6,772,384 B1 * | 8/2004 | Noguchi | 714/755 |
| 6,865,215 B1 | 3/2005 | Russell et al. | |
| 6,950,627 B2 | 9/2005 | Vicari | |
| 6,963,599 B1 | 11/2005 | Dunn | |
| 6,990,319 B2 | 1/2006 | Wright et al. | |
| 7,308,043 B1 * | 12/2007 | Frank | 375/303 |
| 7,336,695 B1 | 2/2008 | Hendershot | |
| 7,949,032 B1 | 5/2011 | Frost | |
| 2003/0189638 A1 | 10/2003 | Fry | |

(Continued)

FOREIGN PATENT DOCUMENTS

EP    1717962    11/2006

OTHER PUBLICATIONS

Rao, Shreharsha, "Implementing a Bidirectional Frequency Hopping Application with TRF6903 and MSP430", "Application Report", Sep. 2004, vol. SWRA041, Publisher: Texas Instruments.

(Continued)

*Primary Examiner* — David C. Payne
*Assistant Examiner* — Brian J Stevens
(74) *Attorney, Agent, or Firm* — Fogg & Powers LLC (57) ABSTRACT

A method of communicating over a network for wireless communications is disclosed. The method transmits encoded data from a source device to a destination device via a single path up through a plurality of wireless paths using a random frequency hopping tuning pattern for wireless communications, and pseudo-randomly varies dwell times of the frequency hopping tuning pattern over which the data is transmitted. The network uses forward-error correction coding redundancy within a data burst to allow recovery of corrupted data in any partially jammed hop of the transmitted data.

19 Claims, 5 Drawing Sheets

U.S. PATENT DOCUMENTS

| | | | | |
|---|---|---|---|---|
| 2004/0233858 A1* | 11/2004 | Karaoguz | | 370/254 |
| 2006/0140251 A1 | 6/2006 | Brown et al. | | |
| 2006/0204009 A1* | 9/2006 | Li et al. | | 380/255 |
| 2008/0019422 A1 | 1/2008 | Smith et al. | | |
| 2008/0112360 A1 | 5/2008 | Seidel et al. | | |
| 2008/0233404 A1* | 9/2008 | Wolk et al. | | 428/411.1 |

OTHER PUBLICATIONS

European Patent Office, "European Search Report", Jan. 14, 2009, Published in: EP.

"What is FHSS?", Mar. 26, 2012, pp. 1-3, Publisher: http://www.webopedia.com/TERM/F/FHSS.html accessed Mar. 26, 2012.

"Forward Error Correction", "http://en.wikipedia.org/wiki/Forward_error_correction accessed Mar. 10, 2012", pp. 1-10, Publisher: Wikipedia.

"Frequency-hopping Spread Spectrum", "http://en.wikipedia.org/wiki/Frequency-hopping_spread_spectrum accessed Mar. 26, 2012", pp. 1-7, Publisher: Wikipedia.

Jacobsmeyer, "Introduction to Error-Control Coding", Aug. 5, 2004, pp. 1-16, Publisher: Pericle Communications Company.

* cited by examiner

SYSTEM AND METHODS FOR SECURING DATA TRANSMISSIONS OVER WIRELESS NETWORKS

CROSS REFERENCE TO RELATED APPLICATIONS

This application claims the benefit of priority to and incorporates by reference the entirety of U.S. Provisional Patent Application Ser. No. 60/978,365, filed on Oct. 8, 2007 and entitled "ROBUST WIRELESS SIGNALING METHODS TO DEFEAT JAMMING INTERFERENCE IN STATIONARY TOPOLOGY WIRELESS NETWORKS."

This application is also related to commonly assigned U.S. Provisional Patent Application Ser. No. 60/978,368, filed on Oct. 8, 2007 and entitled "WIRELESS NETWORKS FOR HIGHLY DEPENDABLE APPLICATIONS" (the '368 application) and U.S. patent application Ser. No. 12/246,370, filed on even date herewith and entitled "WIRELESS NETWORKS FOR HIGHLY DEPENDABLE APPLICATIONS" (the '17593 Application). The '368 and '17593 Applications are incorporated herein by reference in their entirety.

BACKGROUND

Wireless communications systems, such as "friend" or "friendly" wireless networking systems, are often power- and bandwidth-limited. These systems can be constrained due to safety regulations or size, weight, and power limitations. A typical network topology for these systems is easily penetrated by an "unfriendly" interloping jamming device. Typically, this jamming device issues a high level of signal interference for jamming any transceivers present in the "friendly" system.

In addition, one or more of these transceivers will typically not provide enough transmission power as a defense again the jamming device. Thus, intelligent jamming avoidance for the network is necessary rather than a higher transmission power with respect to the jamming device. For example, the jamming device can take advantage of these power-limited networks by finding and adapting to a "victim" signal as nearly as quickly as the victim signal changes frequencies. As a result, any attempts to avoid the jamming device (such as moving to another channel) are likely ineffective, unless the frequency switching speed is impractically short. In addition, since the jamming device quickly learns the "victim" signal, the bandwidth available will need to be utilized wisely. For example, typical parameters that the jamming device learns by listening include center frequency, bandwidth, modulation type, hopping scheme, hopping frame timing, and signal transmission burst size(s). In the case of most commercial and industrial communications, these parameters are readily discernable. For example, users of the jamming device may already know the entire channel allocation, bandwidths, and modulation types from earlier site surveys and studies.

The jamming device will surely not know the unpredictable random progression of frequency hopping through the channels in a time-frequency domain (assuming any scrambling algorithm of the jamming device is made adequately robust). In short range applications such as inside buildings, industrial campuses, and within aircraft however, any propagation delay experienced by this random progression, which might otherwise corrupt the jamming device's estimates of hop framing, is often too insignificant to benefit any of the "friend" communication links. As a result, current jamming devices are able to "look-through" their own jamming to see the signal transmission, determining this random progression of frequency hopping through the channels by observing the beginning of each dwell, and jamming the reminder before the dwell time of the signal transmission is over, successfully jamming the transmission. This "look-through" class of jamming devices includes: (1) Repeat Jammers (for example, a digital radio frequency memory, or DRFM-enabled class of jamming devices); (2) Follower Jammers (copying any frequency hopping); and (3) Matched Spectrum Jammers, among others.

Each of the above-mentioned jamming devices employs current off-the-shelf technology (and therefore is easily implemented), and is a high probability threat. Typical adaptations against these jamming device classes involve a temporary loss of data connectivity, which is intolerable in nearly all commercial and industrial wireless networking applications.

SUMMARY

The following specification provides for a system and methods for securing data transmissions over wireless networks. Particularly, in one embodiment, a method of communicating over a wireless communications link transmits encoded data from a source device to a destination device via a wireless channel using a random frequency hopping tuning pattern for wireless communications, which also pseudo-randomly varies the dwell times of the frequency hopping tuning pattern over which the data is transmitted. As a plurality of such links are combined into a wireless network, each link becomes more robust, improving the probability that several links are successfully closed (that is, not jammed) such that the network distributes a plurality of redundant copies of the encoded data via the plurality of wireless paths having a variable period of the dwell times and substantially increases the probability of successful message delivery between the source device and the destination device.

BRIEF DESCRIPTION OF THE DRAWINGS

These and other features, aspects, and advantages are better understood with regard to the following description, appended claims, and accompanying drawings where:

Like reference characters denote like elements throughout the figures and text of the specification.

DETAILED DESCRIPTION

Embodiments disclosed herein relate to a system and methods for securing data transmissions over wireless networks employing at least one form of frequency-hopping (FH) spread spectrum communications. For example, at least one embodiment relates to providing pseudo-random variable dwell times within each FH spread spectrum transmission to overcome any intelligent "look-through" jamming devices. As further discussed herein, these pseudo-random variable dwell times have an aperiodic "hop rate" that substantially reduces and eliminates any security breaches in a wireless communications system and prevents any loss of communications data due to hop-synchronized signal jamming. These pseudo-random variable dwell times defeat a common "look-through" jamming strategy that would otherwise attempt to observe and learn the hop timing of a particular wireless link, so as to synchronize any jamming look-through intervals and on-times for energy focus against that particular link.

In one implementation, data-encoded signals transmitting the communications data are configured to move (that is, frequency hop) quickly enough so that a jamming device ("jammer") is unable to follow in time and send enough interfering energy into a wireless communications transceiver before the frequency changes ("hops"). By coupling the rapid switching with the aperiodic hop interval, the jammer cannot exploit any observations of the victim signal in time to be successful in jamming the latter portion of the dwell time. As a result, the jammer will revert to a much less effective jamming scheme, such as brute force barrage noise or partial band jamming, which will not defeat a robustly designed frequency hopping wireless link.

The methods of securing data transmissions discussed herein provide significant protection to commercial and industrial wireless data links against deliberately hostile jamming attacks that strive to disrupt communications. In particular, the embodiments disclosed are suitable for use in commercial aircraft (and the like) having on-board wireless data links that form a distributed sensor and control network. In addition, the system and methods discussed herein is readily applicable to any wireless data network with a stationary topology for any particular implementation, such as municipal buildings, courthouses, police stations, industrial factories, process control plants, financial centers, and the like.

Figure 1:
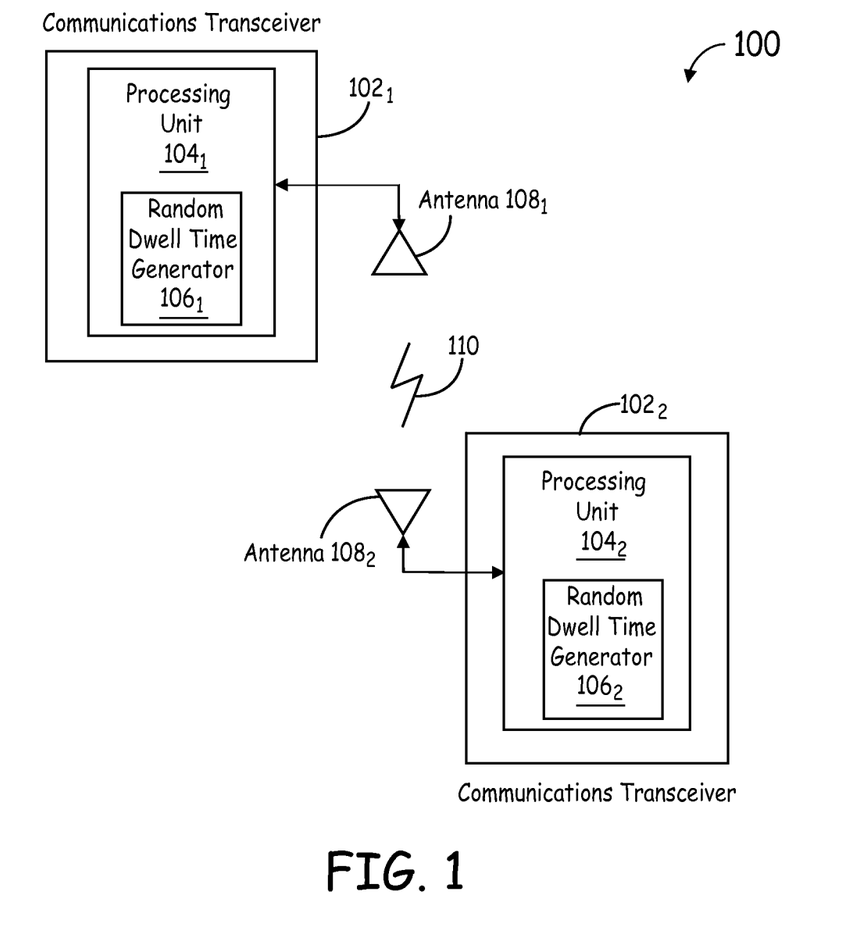
FIG. 1 is a block diagram of an embodiment of a system for wireless communications.

FIG. 1 is a block diagram of an embodiment of a system 100 for wireless communications. The system 100 comprises communications transceivers 102-1 and 102-2 and antennas 108-1 and 108-2, respectively. As shown in FIG. 1, the antennas 108-1 and 108-2 transfer data-encoded signals over a wireless signal link 110. In addition, each of the communications transceivers 102-1 and 102-2 include a processing unit 104-1 and 104-2, respectively. In turn, each of the processing units 104 further includes a random dwell time generator 106.

As discussed in further detail below with respect to FIG. 2, the random dwell time generators 106-1 and 106-2 provide pseudo-random variable dwell times in FH spread spectrum communications transmissions between the communications transceivers 102-1 and 102-2. In one implementation, pseudo-random codeword generators tied to the node ID number, network ID number, time of day, and other random seeding parameters are used to generate these variable dwell times from the random dwell time generator 106 of each communications transceiver 102 installed in a particular wireless communications network. In one embodiment, for example, the communications transceivers 102 of FIG. 1 are implemented in the wireless communications network configured with multi-hop network layer coding for secure networks as further described in the '368 and '17593 Applications.

In one embodiment, each of the processing units 104 provide for a set of sensing and receiver performance metrics to tailor an aperiodic hop rate of the data-encoded signal transfers between the communications transceivers 102 around fixed jamming device frequencies (and other jamming signal avoidance capabilities). Since a fast (but a fixed period) frequency hopping pattern can be defeated by a jammer (for example, using look-through intervals synchronized to a dwell time of the frequency hopping pattern), the random dwell time generator 106 uses the aperiodic hop rate to prevent a jammer from using these look-through jamming techniques. To hop fast enough to prevent follower-jamming, the variable dwell times (in one implementation) will be less than about 30 to 60 μs using a signal transmission framework for pseudo-random variable dwell times, as discussed in further detail below with respect to FIG. 3.

Figure 2:
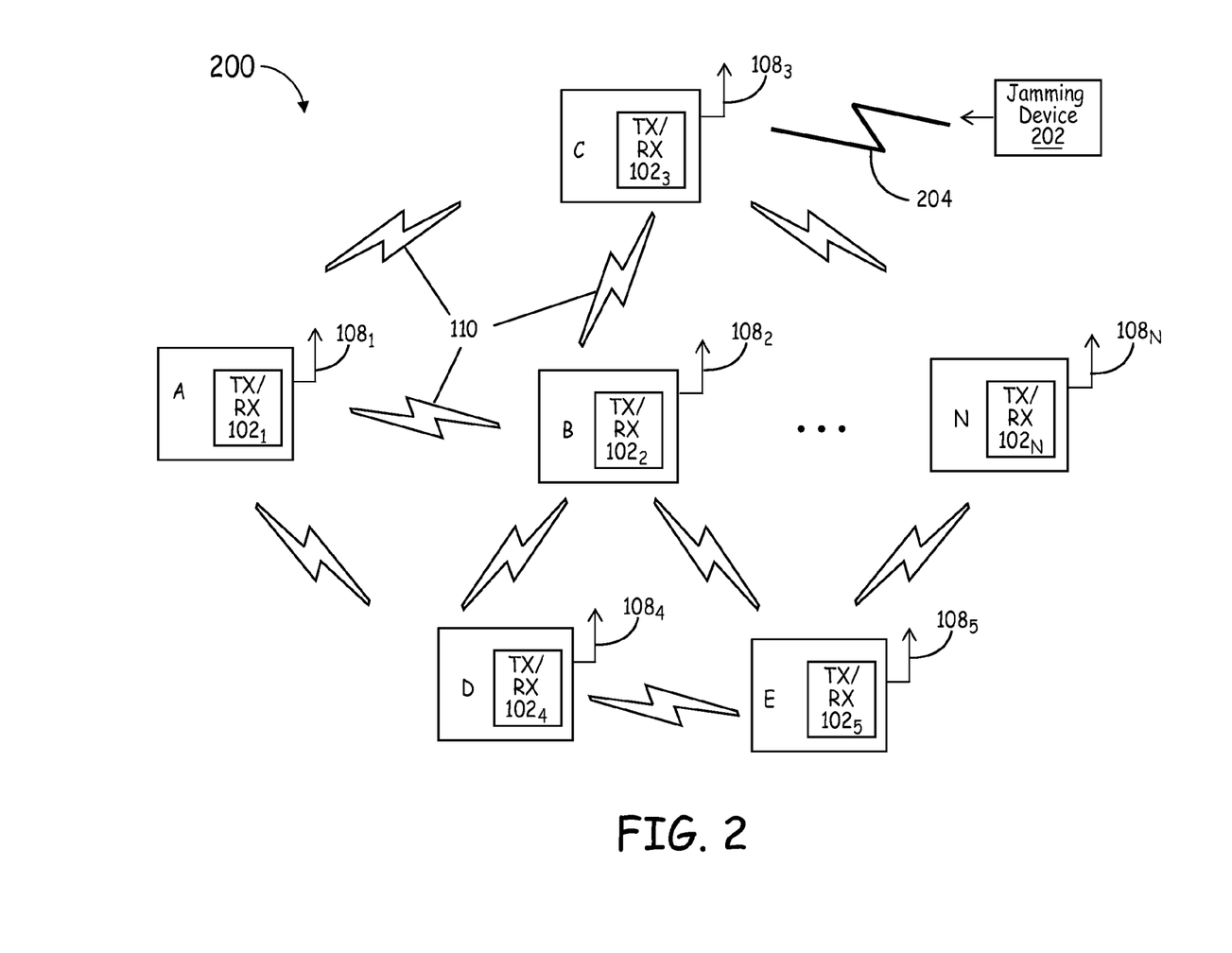
FIG. 2 is a block diagram of an embodiment of a network for wireless communications including the system of FIG. 1.

FIG. 2 is a block diagram of an embodiment of a network 200 for wireless communications, including the system 100 of FIG. 1. The network 200 comprises a plurality of wireless communications devices A-E . . . N. Although only six wireless devices are depicted in this embodiment, for purposes of explanation, it is to be understood that any number of wireless devices are applicable in other embodiments. In one embodiment, for example, each of the wireless devices receive and transmit the data-encoded signals based on a "one-hop" transmission sequence, where each of the wireless devices are connected to each other as shown in FIG. 2. In at least one embodiment, a Direct Sequence Spread Spectrum (DSSS) or ultra wide band (UWB) technique determines the one-hop transmission sequence between each of the wireless devices.

Each of the wireless devices shown in FIG. 2 includes the communications transceiver (TX/RX) 102 and the antenna 108 discussed above with respect to FIG. 1. Furthermore, each of the wireless devices is located in a fixed position relative to the other wireless devices. However, it is understood that the random dwell time techniques discussed herein are suitable for use at any location of the wireless devices.

The system shown in FIG. 2 further illustrates a jamming device 202 providing a jamming signal 204 to the wireless signal links 110. To aid in illustration, the jamming device 202 of FIG. 2 is considered a pulsed duty-cycle jamming device that issues the jamming signal 204 at a higher power level than a signal power level of the wireless signal links 110 connecting the wireless devices. In one implementation, the jamming device 202 is located at least half the distance away from the fixed distance between any two of the wireless devices (that is, it has a range ratio advantage). It is understood that for other implementations of the network 200, alternate embodiments of the jamming device 202 and the jamming signal 204, including narrow-band (continuous wave), wideband jamming, and pulse modulation, will be encountered.

In operation, and with reference to the communications transceivers 102 of FIG. 1, the random dwell time generator 106 of each of the communications transceivers 102 in the wireless devices defeats any potential jamming attacks from the jamming device 202 with a pseudo-random variable dwell time and aperiodic hop rate for the data-encoded signal transfers between the wireless devices. For example, if the jamming device 202 attempts to listen to a "victim" signal transmission and sends out the jamming signal 204 to exploit any learned parameters of the victim signal transmission, the random dwell time generator 106 denies the jamming device 202 any ability to learn the contents of the victim signal transmission rapidly and accurately enough to attempt any further jamming of the victim signal transmission for the reminder of that dwell time.

In one implementation, the jamming device 202 will be allowed to "attack" a tail of a victim transmission; however, the pseudo-random variability of the dwell times substantially eliminates any significant benefits for the jamming device 202. For additional robustness, Forward Error Correction (FEC) coding redundancy, such as Reed-Solomon, BCH, Convolutional/Viterbi, turbo, or low-density parity-check (LDPC) coding, along with interleaving data is employed on the communications link to allow recovery of corrupted data in partially jammed dwell times (either due to look-through successes on the longer dwell intervals, or "lucky" jammer hits). As a result, the random dwell time generator 106 substantially reduces an amount of time the jamming device 202 will have to insert any interference signal energy into the communications transceiver 102, and the FEC coding recovers the corrupted data that any jamming impacts. In addition, at least one secure communications data transmission method discussed here denies any power advantage the jamming device 202 derives from intelligent "listen-and-learn" techniques. This denial substantially reduces any jamming threats from the jamming device 202 and wastes substantially all transmission power of the jamming device 202. As a result, the data for the (potential victim) communications transceivers 102 in the wireless devices remain "clean" (that is, not corrupted).

The wireless devices of the network 200 use FEC and wireless signal path redundancy (for example, repeat messages from different sources with different dwell times) between the wireless devices, which enhances the redundancy of the data, allowing it to survive partially successful (in the time domain) jamming attacks on any given wireless link. In one embodiment, this same technique is employed in a single multi-channel link, and the aperiodic dwell times combined with the FEC coding redundancy make that link more survivable. As multiple path repeats of a message are generated, the network 200 allows loss of at least a portion of the data on some links, but success on others, which improves the message delivery success further over that of a single link. In addition, the combination of FEC and wireless signal path redundancy using the aperiodic hop rate provides for substantially simultaneous data-encoded signal transmissions within the network 200 at a prescribed data transfer rate.

The primary purpose of the aperiodic hop rate is to degrade a look-through efficiency of the jamming device 202. For example, this aperiodic (and asynchronous) hopping occurring between each of the wireless devices creates a "selection" problem for the jamming device 202. Initially, the jamming device 202 knows when/where to transmit (as soon as it detects a hop), but does not know when to stop (that is, the jamming device 202 is unable to detect an end of a particular dwell time) and when to start listening for the next hop channel.

In one circumstance, the random dwell time generator 106 for each of the communications transceivers 102 instructs the communications transceiver 102 to send the next hop of transmission while the jamming device 202 remains at the last known dwell time. In at least one alternate circumstance, the communications transceiver 102 sends the next hop at a second, unknown dwell time after the jamming device 202 is done. As a result, the aperiodic hop rate substantially reduces a probability of success for the jamming device 202.

Figure 3:
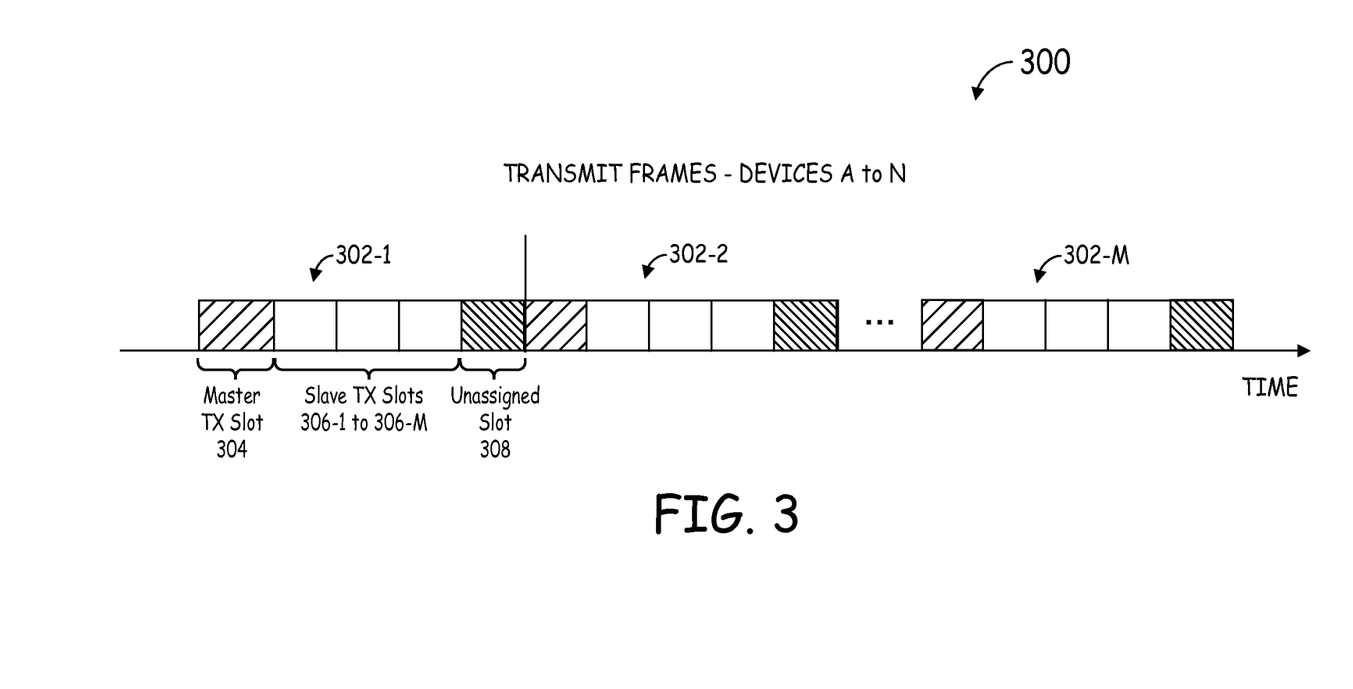
FIG. 3 is an illustration of an embodiment of a signal transmission framework for the wireless network of FIG. 2.

FIG. 3 is an illustration of an embodiment of a signal transmission framework 300 for the wireless network 200 of FIG. 2. In one implementation, each of the wireless devices transmits in an assigned Time-Division Multiple Access (TDMA) time slot. The signal transmission framework 300 comprises a slot-based time-division scheduling technique, where each slot represents about 4 ms (alternate times are appropriate). It is to be understood that other techniques such as Carrier Sense Multiple Access (CSMA), Code Division Multiple Access (CDMA), and the like, are used in alternate implementations. In the example embodiment of FIG. 3, each transmit frame 302-1 to 302-M in the framework 300 comprises a master transmit (TX) slot 304, one or more slave TX slots 306-1 to 306-M, and an unassigned slot 308. For purposes of this description, the master TX slot 304 is used by an originating device of the network 200, with one or more of the other devices A-N intended to receive the data transmission identified in the slave TX slots 306. In one implementation, the unassigned slot 308 is included for every frame to accommodate a possible retransmission of the data or any additional control messages using a round robin (or similar) scheduling routine. In the example embodiment of FIG. 3, a packet size of each of the transmit frames 302 comprises 256 bytes for each of the slots 304 to 308.

In operation, at least one form of intelligent frequency hopping (FH) is implemented in the system of FIGS. 1 and 2 using the signal transmission framework 300. In one embodiment, the framework 300 provides a communications bandwidth spread for a Frequency Hopping Spread Spectrum (FHSS) technique with a suitable range ratio (for example, at least 2 GHz; and not necessarily contiguous). This bandwidth spread provides (a) a quasi-uniform distribution of hop channels over the bandwidth spread, (b) uses an adaptive "hopset" of intelligent FH to defeat a jammer (for example, the jamming device 202 of FIG. 2).

In one embodiment, the signal format for the framework 300 comprises a shaped offset quadrature phase shift keying (S-OQPSK) framework with one of the turbo, LDPC, Convolutional/Viterbi, or RS FEC coding redundancy discussed above with respect to FIG. 2. The framework 300 provides for a near constant signal envelope shaping for transmission efficiency at a bandwidth of about 1-2 MHz (0.5-1 Mbps). In this embodiment, use of the FHSS spectrum is optional. The framework 300 further allows for use of short transmission bursts of varying lengths (for example, 256-1024 bytes with 2-10 ms burst times) and frequency hops the transmission signals substantially faster (for example, at least 100 times) than on a burst-by-burst basis using the quasi-uniform distribution. For interleaving short burst messages, a single RS FEC or turbo block coding per message frame 302 provides the necessary message redundancy and wireless network layer coding. The framework 300 will accommodate bandwidth allocations spread over about 1-2 GHz, with about 25-50 hop channels at a communications bandwidth of 2 MHz. As a result, a transmission burst success rate will increase with a spread of the dwell time.

By varying dwell times within each transmission burst, along with the period of the bursts, implementing the framework 300 in the network 200 discussed above with respect to FIG. 2 prevents the jammer from locking onto the aperiodic hop rate and jamming a "victim" signal transmission. This pseudo-random variability of the dwell times and the hop rate forces the jammer to use a much less energy efficient (and substantially less effective) brute force approach.

In one implementation, the multiple-hop mesh network topology of the network 200 shown in FIG. 2 provides a desired jamming/signal range ratio for implementing the intelligent frequency hopping discussed herein. In addition, the multiple-hop mesh network 200 provides a desired amount of wireless signal path redundancy to route the data transmissions around the jamming device 202. Moreover, the above-mentioned jamming device/signal range ratio makes the jamming device 202 work harder. As a result, use of the framework 300 in the network 200 substantially reduces an amount of time the jamming device 202 will have to insert any interference signal energy into the communications transceiver 102.

Figure 4:
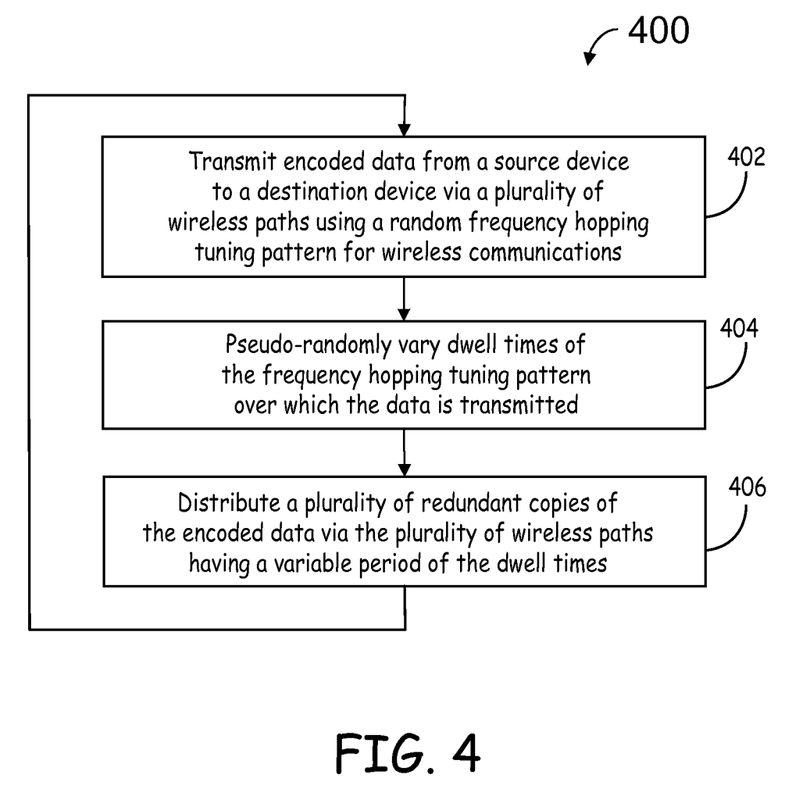
FIG. 4 is a flow diagram of an embodiment of a method of communicating over a network for wireless communications.

FIG. 4 is a flow diagram of an embodiment of a method 400 of communicating over a network for wireless communications. In particular, the method 400 is implemented in one or more devices for wireless communications such as the devices A-N of the network 200 as discussed above. In addition, the method shown in FIG. 4 embodies the use of the communications framework within each of the devices as discussed above with respect to FIG. 3. In one embodiment, the network is configured with multi-hop network layer coding for spread-spectrum wireless communications, similar to the network disclosed in the '368 and '17593 Applications.

The method 400 transmits encoded data from a source device over a plurality of channels to a destination device via a plurality of wireless paths using a random frequency hopping tuning pattern for wireless communications (block 402). The devices used in the method 400 include a random dwell time generator to pseudo-randomly vary dwell times of the frequency hopping tuning pattern over which the data is transmitted (block 404). Further, the method 400 uses forward-error correction coding redundancy within a data burst to allow recovery of corrupted data in any partially jammed hop of the transmitted data when distributing the plurality of redundant copies of the encoded data via the plurality of wireless paths having a variable period of the dwell times (block 406).

In one implementation, pseudo-randomly varying the dwell times involves periodically modifying a prescribed variance in a length of the dwell times of the encoded data transmissions to achieve an aperiodic hop rate. In addition, the method 400 will adjust the dwell times between the aperiodic hops to accommodate variations in data transfer rates for each of the encoded data transmissions. In a similar implementation, the method 400 further uses an adaptive learning process with a variable redundancy rate having a prescribed redundancy threshold level to discover one or more security breaches in the network when pseudo-randomly varying the dwell times, as described in further detail below with respect to FIG. 5. For example, in one embodiment, using the adaptive learning process with the variable redundancy rate further involves using at least one form of forward error correction in achieving substantially simultaneous encoded data transmissions between the source device and the destination device via the plurality of wireless paths while reducing the prescribed redundancy threshold level of the adaptive learning process.

Figure 5:
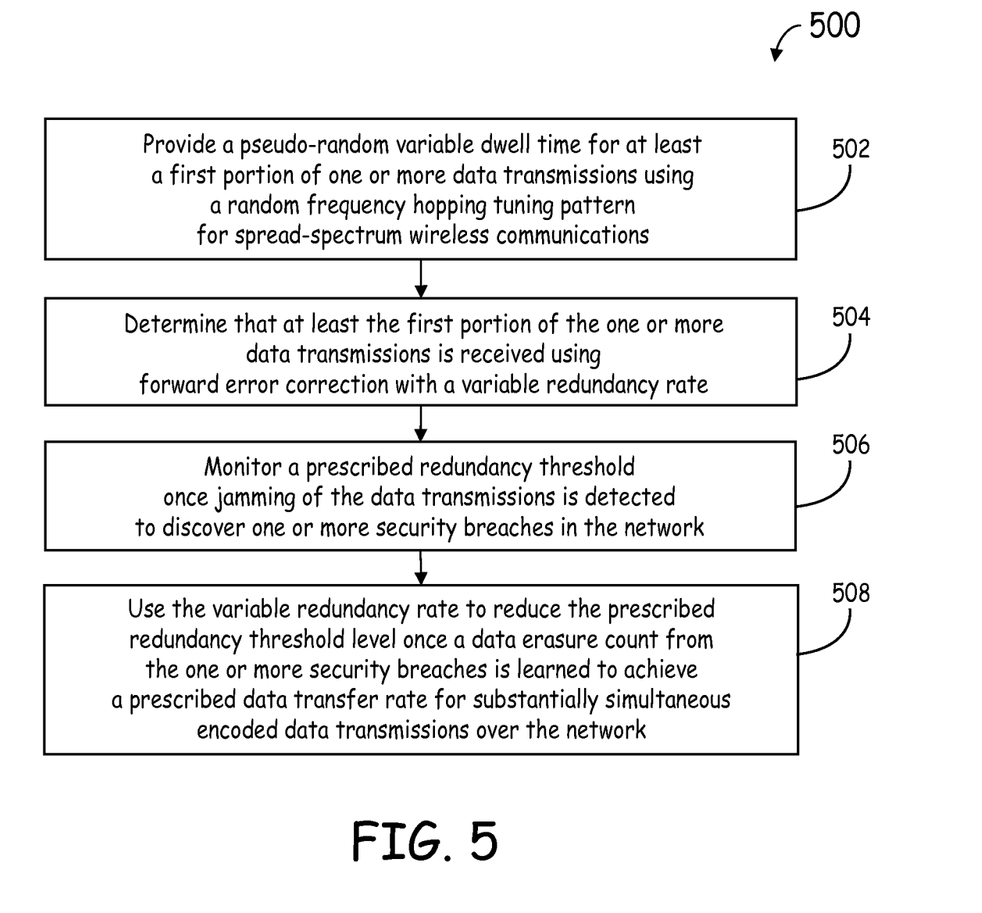
FIG. 5 is a flow diagram of an embodiment of a method for securing data over a network for wireless communications.

FIG. 5 is a flow diagram of an embodiment of a method 500 for securing data over a network for wireless communications. In one embodiment, the method 500 is implemented in the random dwell time generator 106 of the communications transceivers 102 of the system 100 of FIG. 1 to defeat any "look-through" jamming device, similar to the jamming device 202 of FIG. 2, which detects the victim hop almost immediately.

In one embodiment, the method 500 provides a pseudo-random variable dwell time operable for at least a first portion of one or more data transmissions over the network using a random frequency hopping tuning pattern for spread-spectrum wireless communications (block 502). The method 500 determines that at least the first portion of the one or more data transmissions is received using forward error correction with a variable redundancy rate (block 504). The pseudo-random variable dwell time of the method 500 substantially eliminates security breaches in the data transmissions.

In particular, the method 500 monitors a prescribed redundancy threshold level once jamming of the data transmissions is detected to discover one or more security breaches in the network (block 506). The method 500 further uses the variable redundancy rate to reduce the prescribed redundancy threshold level once a data erasure count from the one or more security breaches is learned to achieve a prescribed data transfer rate for substantially simultaneous encoded data transmissions over the network (block 508). In one implementation, and with reference to the network shown in FIG. 2, the pseudo-random variable dwell time allows the jamming device 202 to begin jamming the victim transmission quickly, however, the jamming device 202 is unable to predict how long to transmit. As an example, the jamming device 202 is unaware of when the current dwell time ends and transmission hops to another frequency. The jamming device 202 will either not jam long enough to finish corrupting the data at the end of the dwell time or may stay on one dwell time too long and be unable to catch the beginning of a subsequent dwell time. In one embodiment, the method 500 allows for the partial jamming collisions, and further survives the collisions using at least one form of forward error correction (FEC) coding, including one of Reed-Solomon (RS), turbo or low-density parity-check FEC coding as discussed above with respect to FIG. 3. Further, a data interleaving process ensures that sections of each codeword are placed at the beginning of some dwells of at a least a portion of the one or more data transmissions, and at the end of others, so any sequential dwell-tail jamming successes only corrupt portions of a codeword, but not enough to cause a decode failure below the code recovery threshold.

The method 500 ensures that at least a substantial portion of the frequency-hopping (FH) signal is secured. The pseudo-random variable dwell time periodically modifies prescribed variances in the FH dwell sizes to achieve an aperiodic hop rate. For example, the prescribed variances will add or subtract to a dwell time period of the data transmissions to ensure a higher or lower percentage of cleared bits in each victim transmission and achieve the prescribed data transfer rate discussed above.

In addition, the method 500 provides a plurality of transmission bursts of varying lengths of the one or more data transmissions. In one implementation, one or more of the transmission bursts frequency hop the transmission signals using a quasi-uniform distribution of FH channels. For example, the communications transceiver provides the transmission bursts based on a spread of the pseudo-random variable dwell time during each transmission burst.

As discussed above, the method 500 further comprises using a variable redundancy rate to operate against the security breaches caused by the jamming device 202. For example, for short transmission bursts without any interleaving of the data, the message will include at least one error correcting codeword. In this implementation, a prescribed level of coding redundancy overcomes data erasures that the jamming device 202 is capable of causing. For example, the FEC coding approach implemented in the random dwell time generator prevents a loss of data due to the partial overlaps and allows successful demodulation of the error correcting codeword. In addition, at least one form of adaptive learning with a prescribed redundancy threshold level is used as soon as jamming is detected. This adaptive learning process involves reducing the threshold level once the communications transceiver learns a data erasure count to achieve the prescribed data transfer rate between the wireless devices.

The methods and techniques described herein may be implemented in a combination of digital electronic circuitry and can be realized by hardware, executable modules stored on a computer readable medium, or a combination of both. An apparatus embodying these techniques may include appropriate input and output devices, a programmable processor, and a storage medium tangibly embodying program instructions for execution by the programmable processor. A process embodying these techniques may be performed by the programmable processor executing a program of instructions that operates on input data and generates appropriate output data. These techniques may be implemented in one or more programs that are executable on a programmable system including at least one programmable processor coupled to receive data and instructions from (and to transmit data and instructions to) a data storage system, at least one input device, and at least one output device. Generally, the processor will receive instructions and data from at least one of a read only memory (ROM) and a random access memory (RAM). In addition, storage media suitable for tangibly embodying computer program instructions and data include all forms of non-volatile memory, and include by way of example, semiconductor memory devices; magnetic disks such as internal hard disks and removable disks; magneto-optical discs; optical discs, and other computer-readable media.

When information is transferred or provided over a network or another communications connection (either hardwired, wireless, or a combination of hardwired or wireless) to a computer, a computer properly views the connection as a computer-readable medium. Thus, any such connection is properly termed a computer-readable medium. Combinations of the above are also included within the scope of computer-readable media.

This description has been presented for purposes of illustration, and is not intended to be exhaustive or limited to the embodiments disclosed. Variations and modifications may occur, which fall within the scope of the following claims.

What is claimed is:

1. A method of communicating over a network for wireless communications, the method comprising:
   transmitting encoded data from a source device to a destination device via a single path up through a plurality of wireless paths using a random frequency hopping tuning pattern for wireless communications;
   pseudo-randomly varying dwell times of the frequency hopping tuning pattern over which the data is transmitted; and
   using forward-error correction coding redundancy within a data burst to allow recovery of corrupted data in any partially jammed hop of the transmitted data, including using an adaptive learning process with a variable redundancy rate.

2. The method of claim 1, wherein pseudo-randomly varying the dwell times further comprises:
   periodically modifying a prescribed variance in a length of the dwell times of the encoded data transmissions to achieve an aperiodic hop rate; and
   adjusting the dwell times between the aperiodic hops to accommodate variations in data transfer rates for each of the encoded data transmissions.

3. The method of claim 1, wherein pseudo-randomly varying the dwell times further comprises:
   using the adaptive learning process with the variable redundancy rate having a prescribed redundancy threshold level to discover one or more security breaches in the network.

4. The method of claim 1, wherein using the adaptive learning process with the variable redundancy rate further comprises:
   using the forward error correction coding redundancy in achieving substantially simultaneous encoded data transmissions between the source device and the destination device via the plurality of wireless paths while reducing a prescribed redundancy threshold level of the adaptive learning process.

5. The method of claim 1 further comprising varying the dwell time between 30 to 60 microseconds.

6. A method for securing data over a network for wireless communications, the method comprising:
   transmitting encoded data from a source device to a destination device;
   providing a pseudo-random variable dwell time for at least a first portion of one or more data transmissions over the network using a random frequency hopping tuning pattern for spread-spectrum wireless communications;
   determining that at least the first portion of the one or more data transmissions is received using forward error correction with a variable redundancy rate;
   monitoring a prescribed redundancy threshold level once jamming of the data transmissions is detected to discover one or more security breaches in the network; and
   using the variable redundancy rate to reduce the prescribed redundancy threshold level once a data erasure count from the one or more security breaches is learned to achieve a prescribed data transfer rate for substantially simultaneous encoded data transmissions over the network.

7. The method of claim 6, further comprising:
   providing a plurality of transmission bursts of varying lengths of the one or more data transmissions, wherein one or more of the transmission bursts frequency hop the transmission signals using a quasi-uniform distribution of frequency hopping channels.

8. The method of claim 7, wherein providing the transmission bursts of varying lengths comprises providing the transmission bursts based on a spread of the pseudo-random variable dwell time during each transmission burst.

9. The method of claim 6, wherein providing the pseudo-random variable dwell time further comprises:
   periodically modifying a prescribed variance in the dwell time of the one or more data transmissions to achieve an aperiodic hop rate.

10. The method of claim 9, wherein periodically modifying the prescribed variance comprises adjusting a period of the dwell time between the aperiodic hops.

11. The method of claim 6, wherein using the variable redundancy rate to reduce the prescribed redundancy threshold level further comprises:
    providing at least one error correction codeword to overcome data erasures caused by a jamming device.

12. A computer program product comprising:
    a computer-readable storage medium having executable instructions for implementing the method for securing data over a network for wireless communications according to claim 6.

13. The method of claim 6 further comprising varying the dwell time between 30 to 60 microseconds.

14. A network system for wireless communications, comprising:
    a plurality of wireless communications devices, each of the devices coupled to a plurality of the other devices via corresponding wireless signal links, each of the devices including:
    a communications transceiver having a processing unit; and
    a random dwell time generator within the processing unit, the random dwell time generator operable to transmit data-encoded signals on at least one wireless path between the wireless signal links using a random frequency hopping tuning pattern,
    wherein the random dwell time generator is operable to:

pseudo-randomly vary a frequency hopping dwell time of the frequency hopping tuning pattern over which the data-encoded signals are transmitted, and determine a transmission sequence for transmitting a plurality of redundant copies of the data-encoded signals based on a variable period of the dwell time.

15. The system of claim 14, wherein the random dwell time generator is operable to: periodically modify a prescribed variance in a dwell time length of the data-encoded signals to achieve an aperiodic hop rate; and adjust the dwell time length between the aperiodic hops to accommodate variations in data transfer rates of the data-encoded signals.

16. The system of claim 15, wherein the random dwell time generator is further operable to:

provide an adaptive learning process with a variable redundancy rate and a prescribed redundancy threshold level to discover one or more security breaches in the network; and perform forward error correction on a plurality of redundant copies of the data-encoded signals to reduce the prescribed redundancy threshold level.

17. The system of claim 14, wherein each of the devices transmits the data-encoded signals using one of a direct sequence spread spectrum or an ultra wide band communications spectrum for each of the plurality of channels.

18. The system of claim 14, wherein each of the devices receive and transmit the data-encoded signals based on a one-hop transmission range.

19. The system of claim 14, wherein the variable period of the dwell time is between 30 to 60 microseconds.

* * * * *